UNITED STATES PATENT OFFICE.

AUGUSTE J. ROSSI AND LOUIS E. BARTON, OF NIAGARA FALLS, NEW YORK, ASSIGNORS TO THE TITANIUM ALLOY MANUFACTURING COMPANY, OF NEW YORK, N. Y., A CORPORATION OF MAINE.

METHOD OF OBTAINING TITANIC OXID.

1,106,409.     Specification of Letters Patent.     Patented Aug. 11, 1914.

No Drawing.     Application filed February 6, 1913. Serial No. 746,567.

*To all whom it may concern:*

Be it known that we, AUGUSTE J. ROSSI and LOUIS E. BARTON, both citizens of the United States, and residents of Niagara Falls, in the county of Niagara and State of New York, have jointly invented certain new and useful Improvements in Methods of Obtaining Titanic Oxid, of which the following is a specification.

Our present invention relates to methods for deriving titanic oxid concentrates from substances containing such oxid and iron oxid, especially such substances containing comparatively high percentages of iron oxid, as for example ordinary titaniferous iron, or ilmenite, ores, as distinguished from such substances containing low percentages of iron oxid and known for example as "rutile" ores.

The object of our invention comprise provision of a novel, industrially practicable, method, whereby, from such substances, may be obtained, at less cost, loss, labor and skill, and with greater certainty than formerly, concentrate products containing exceptionally high percentage of titanic oxid, and exceptionally low, if any, percentages of iron oxid or other undesirable substances, and possessing also properties especially adapting them for certain uses.

We have discovered that, by, as a preliminary step, charging and melting, together with said substances, sulfid of an alkali metal as such, preferably sodium sulfid or potassium sulfid, the resulting fusion and melt is distinguished by novel reactions and characteristics by aid of which attainment of our said objects is facilitated and otherwise promoted.

Our novel method is, for example, practised as follows: Into a furnace, provided with refractory linings and capable of developing and maintaining requisite temperature, we charge titaniferous iron ore and, preferably, sodium sulfid, preferably intimately mixed, and heat the same until thoroughly melted. The proportion of the sulfid of the alkali metal should be somewhat in excess of enough to insure formation of ferrous sulfid from all the iron constituents of the ore, of titanate of the alkali metal from all the titanium constituents, and of alkali silicates and aluminates from silica and alumina of the gangue, such proportion being readily calculated from analysis of the particular ore treated. We have, for example, in treating an ore containing about 42% iron oxid and 52% titanium oxid proportioned as follows, viz:—

Ore _____ 100 parts.
Sodium sulfid _____ 100 parts.

This charge gave us good results, the sodium sulfid being present as aforesaid in excess. We believe that during this melt the following reactions principally occurred:—

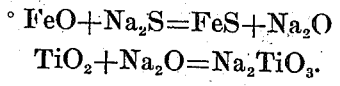
$$FeO + Na_2S = FeS + Na_2O$$
$$TiO_2 + Na_2O = Na_2TiO_3.$$

The melt is removed from the furnace in any convenient manner as by tapping or pouring. The melt is of exceptionally desirable consistency and quality. Though it comes from the furnace as a molten slag capable of being cast and solidified into a solid mass, it is comminutable with exceptional ease, and, if crushed to only about one-quarter inch mesh, will, after one or two days' exposure to the atmosphere, disintegrate into a fine powder very serviceable for our purposes. On the other hand, if so crushed immediately after cooling, its nature and consistency is such as to admit of its immediate successful use in that form in the hereafter described next following step of our process.

We lixiviate our said melt with water. We believe that, during the lixiviation, the following reactions occur. (1) Excess sodium salts dissolve; (2) much iron passes into solution as a ferro sodium sulfid; (3) sodium titanate is decomposed, forming hydrated titanic oxid and sodium hydrate; (4) sodium silicate and sodium aluminate are dissolved.

We prefer to lixiviate first with cold, or merely warm, water, which, owing to the nature and consistency of our melt, operates to dissolve most of the salts, and then we finally lixiviate with hot or boiling water, this being for the purpose of hastening completion of the decomposition of the titanate. For economy, this resulting solution may, as will be understood, be readily freed from its impurities and the salts recovered in form suitable for use in smelting the next charge of ore. The remainder of the melt, *i. e.* the undissolved constitutents thereof, consisting essentially of titanic oxid and iron sulfid, we next boil in a bath containing acid so dilute as to dissolve the therein iron, but not the therein titanium, compounds, and continue such boiling until the former are dissolved, after which the latter are separated therefrom, as by decantation. We prefer to use sulfuric acid on account of its comparative cheapness, but other acids capable, at the same degree of dilution, of dissolving iron sulfid, such for example as hydrochloric acid, may be, though less economically, employed. The proportion of sulfuric, or other, acid thus employed should be calculated from analysis of the residues of the melt insoluble in water. For example, in approximately the ratio of 1.75 parts of sulfuric acid to 1 part of metallic iron, the said acid being diluted by four times its weight of water in the bath. We prefer however to proportion the acid relatively to the iron somewhat in excess, in order to neutralize any small quantities of sodium compounds, including titanate, which may have escaped the lixiviation with water. Our last aforesaid insoluble residue we then calcine after washing it with water, the resulting final product being substantially pure titanic oxid in the form of an amorphous, smooth, soft, white powder, characterized as containing, therewith commingled, traces, or not to exceed one per cent. of iron oxid.

It will be understood that while we prefer to preliminarily mix together the titaniferous substance and the sulfid of the alkali metal before charging and melting, the said mixing might, though unpreferably, be accomplished in any order, or at any stage, of the single operation or heat by which we prepare our said melt, without departing from our invention.

What we claim as new and desire to secure by Letters Patent is the following, viz:—

1. The method of obtaining titanic oxid from a substance containing it and iron oxid which comprises charging and melting together with said substance sulfid of an alkali metal, lixiviating the resulting melt with water, withdrawing the undissolved portion of said melt, and boiling it in a bath containing acid so dilute as to dissolve the therein iron, but not the therein titanium, compounds.

2. The method of obtaining titanic oxid from a substance containing it and iron oxid which comprises charging and melting together with said substance sodium sulfid, lixiviating the resulting melt with water, withdrawing the undissolved portion of said melt, and boiling it in a bath containing acid so dilute as to dissolve the therein iron, but not the therein titanium, compounds.

3. The method of obtaining titanic oxid from a substance containing it and iron oxid which comprises charging and melting together with said substance sulfid of an alkali metal, lixiviating the resulting melt with water, withdrawing the undissolved portion of said melt, and boiling it in a bath containing sulfuric acid so dilute as to dissolve the therein iron, but not the therein titanium, compounds.

4. The method of obtaining titanic oxid from a substance containing it and iron oxid which comprises charging and melting together with said substance sodium sulfid, lixiviating the resulting melt with water, withdrawing the undissolved portion of said melt, and boiling it in a bath containing sulfuric acid so dilute as to dissolve the therein iron, but not the therein titanium, compounds.

5. The method of obtaining titanic oxid from a substance containing it and iron oxid which comprises charging and melting together with said substance sulfid of an alkali metal, lixiviating the resulting melt with water, withdrawing the undissolved portion of said melt, boiling it in a bath containing acid so dilute as to dissolve the therein iron, but not the therein titanium, compounds, and calcining the undissolved residue.

6. The method of obtaining titanic oxid from a substance containing it and iron oxid which comprises charging and melting together with said substance sodium sulfid, lixiviating the resulting melt with water, withdrawing the undissolved portion of said melt, boiling it in a bath containing acid so dilute as to dissolve the therein iron, but not the therein titanium, compounds, and calcining the undissolved residue.

7. The method of obtaining titanic oxid from a substance containing it and iron oxid which comprises charging and melting together with said substance sulfid of an alkali metal, lixiviating the resulting melt with water, withdrawing the undissolved portion of said melt, boiling it in a bath containing sulfuric acid so dilute as to dissolve the therein iron, but not the therein titanium, compounds, and calcining the undissolved residue.

8. The method of obtaining titanic oxid from a substance containing it and iron oxid which comprises charging and melting together with said substance sodium sulfid, lixiviating the resulting melt with water, withdrawing the undissolved portion of said melt, boiling it in a bath containing sulfuric acid so dilute as to dissolve the therein iron, but not the therein titanium, compounds, and calcining the undissolved residue.

9. In obtaining titanic oxid from a substance containing it and iron oxid the steps which consist in making, in one operation or heat, a melt from sulfid of an alkali metal charged as such together with said substance and thereafter lixiviating the resulting melt with water.

10. In obtaining titanic oxid from a substance containing it and iron oxid the steps which consist in making, in one operation or heat, a melt from sulfid of sodium charged as such together with said substance and thereafter lixiviating the resulting melt with water.

AUGUSTE J. ROSSI.
LOUIS E. BARTON.

Witnesses:
WALTER D. EDMONDS,
PHILIP C. PECK.